(12) United States Patent
Soringauer et al.

(10) Patent No.: US 9,610,647 B2
(45) Date of Patent: Apr. 4, 2017

(54) WELDING TORCH

(71) Applicant: Fronius International GmbH, Pettenbach (AT)

(72) Inventors: Franz Soringauer, Pettenbach (AT); Rudolf Brandstötter, Kirchham (AT)

(73) Assignee: Fronius Intenational GmbH, Pettenbach (AT)

( * ) Notice: Subject to any disclaimer, the term of this patent is extended or adjusted under 35 U.S.C. 154(b) by 216 days.

(21) Appl. No.: 14/483,308

(22) Filed: Sep. 11, 2014

(65) Prior Publication Data

US 2015/0069041 A1    Mar. 12, 2015

(30) Foreign Application Priority Data

Sep. 12, 2013  (AT) .............................. A 50577/2013

(51) Int. Cl.
| | | |
|---|---|---|
| *B23K 9/28* | (2006.01) | |
| *B23K 9/10* | (2006.01) | |
| *B23K 9/12* | (2006.01) | |
| *B23K 9/133* | (2006.01) | |
| *B23K 9/29* | (2006.01) | |

(52) U.S. Cl.
CPC .............. *B23K 9/282* (2013.01); *B23K 9/125* (2013.01); *B23K 9/1336* (2013.01); *B23K 9/295* (2013.01)

(58) Field of Classification Search
CPC ......... B23K 9/1336; B23K 9/28–9/282; B23K 9/295
USPC ..................... 219/136, 137 R, 137.2–137.31, 219/137.44–137.71, 138
See application file for complete search history.

(56) References Cited

U.S. PATENT DOCUMENTS

| | | | | |
|---|---|---|---|---|
| 3,573,419 A | | 4/1971 | Henderson | |
| 3,940,586 A | * | 2/1976 | Stearns .................. | B23K 9/296 219/136 |
| 4,285,250 A | * | 8/1981 | Iizuka .................... | B60K 20/02 137/636.2 |
| 4,297,561 A | * | 10/1981 | Townsend .............. | B23K 9/295 219/137.42 |
| 4,403,136 A | * | 9/1983 | Colman .................. | B23K 9/291 219/137.31 |
| 5,045,665 A | * | 9/1991 | Sarkissian .............. | B23K 9/285 219/136 |

(Continued)

FOREIGN PATENT DOCUMENTS

| | | |
|---|---|---|
| AT | 509 589 A4 | 10/2011 |
| CN | 102149504 A | 8/2011 |

(Continued)

OTHER PUBLICATIONS

Austrian Office Action dated Mar. 19, 2014 in Austrian Application No. A 50577/2013.

(Continued)

*Primary Examiner* — Sang Y Paik
(74) *Attorney, Agent, or Firm* — Collard & Roe, P.C.

(57) ABSTRACT

A welding torch, in particular a handheld welding torch, for a melting welding wire, which is guided in a wire core arranged within a protective hose, fastens the protective hose and the welding core within a torch housing of the welding torch independently from one another. For minimizing stresses on the welding torch by the hose package, the protective hose is fastened rotatably and pivotably and the wire core is fastened rotatably to the torch housing.

4 Claims, 2 Drawing Sheets

(56) References Cited

U.S. PATENT DOCUMENTS

| | | | |
|---|---|---|---|
| 5,965,045 A * | 10/1999 | Zigliotto | B23K 9/32 |
| | | | 219/137.31 |
| 9,024,235 B2 | 5/2015 | Fuerlinger et al. | |
| 2005/0072764 A1 | 4/2005 | Lajoie | |
| 2013/0048699 A1 | 2/2013 | Fuerlinger et al. | |
| 2014/0061277 A1 * | 3/2014 | Matiash | B23K 9/1336 |
| | | | 226/188 |

FOREIGN PATENT DOCUMENTS

| | | |
|---|---|---|
| CN | 102917828 A | 2/2013 |
| DE | 20 2013 102 979 U1 | 9/2013 |
| WO | 2005/021199 A1 | 3/2005 |
| WO | 2008/025553 A2 | 3/2008 |
| WO | 2011/153560 A1 | 12/2011 |

OTHER PUBLICATIONS

Chinese Office Action dated Dec. 2, 2015 in Chinese Application No. 201410448411.7.

* cited by examiner

WELDING TORCH

CROSS REFERENCE TO RELATED APPLICATIONS

Applicant claims priority under 35 U.S.C. §119 of Austrian Application No. A 50577/2013 filed Sep. 12, 2013, the disclosure of which is incorporated by reference.

BACKGROUND OF THE INVENTION

1. Field of the Invention

The invention relates to a welding torch, in particular a handheld welding torch, for a melting welding wire, which is guided in a wire core arranged within a protective hose, wherein the protective hose and the welding core are fastened within a torch housing of the welding torch independently from one another.

2. Description of the Related Art

A welding torch is usually connected to a welding device by a hose package. The length of the hose package depends on the application and/or the welding torch. When using a push-pull welding torch, the length may be in the range of up to 16 meters. When using a welding torch without a drive unit for the welding wire, the length usually is in the range of 4 meters. The robot torch in robot applications is also connected to the welding device by a hose package. In the hose package, shielding gas, current, cooling media and the like may be conveyed in addition to the welding wire. The welding wire is conveyed in a wire core, and the wire core may be arranged within a protective hose, so the wire core may be replaced as well. In the welding torch, the welding wire leaves the wire core and is transferred to either a contact tube or the drive unit. The transfer of the welding wire is particularly relevant during insertion of the welding wire, to prevent the welding wire from choosing a different path because of its cast (i. e. the diameter of freely lying wire loops on an even surface).

In general, fixing the protective hose is known for welding torches with as well as without drive unit from the prior art, with the wire core being moved in either as far as it will go in the region of the contact tube or up to the wire inlet nozzle.

Welding torches for a melting welding wire of the present type are described in AT 509 589 A4 and WO 2005/021199 A1, for example, wherein the wire core and the protective hose are fastened within the torch housing independently from one another.

A disadvantage here is that this is a fixed and/or rigid fastening of the protective hose. As a consequence, every movement of the welding torch requires overcoming the resistance of the protective hose and the wire core. Since the protective hose is designed relatively stable, a correspondingly high force is required, which has a negative impact on the handling of the welding torch. Together with the weight of the hose package, this required use of force for overcoming the rigidity of the supply lines constitutes an additional burden for the welder.

Another disadvantage for the conveying of the welding wire is present if the wire core is not fixed, so its position may change. For example, the wire core retracts into the protective hose when the hose package is rolled in, thus making it possible for the welding wire to choose a different path in the welding torch during transfer. Accordingly, the insertion process is delayed and might have to be repeated.

SUMMARY OF THE INVENTION

It is thus the object of the invention to create a welding torch that minimizes the burdens caused by the hose package.

This object is achieved by a welding torch as mentioned above, wherein the protective hose is fastened rotatably and pivotably and the wire core is fastened rotatably to the torch housing. An advantage here is that the position of the wire core is fixed. This is independent from the length and the movements of the hose package. As a consequence, the welding wire is always guided accurately, even during replacement of the welding wire. Another advantage is that this is independent from the type of the welding torch. The invention can thus be used for welding torches with and without drive units as well as for robot torches.

An advantage of a rotatable and pivotable fastening of the wire core and the protective hose to the torch housing is that the burdens for the welder caused by the hose package are reduced and therefore handling is improved. For example, deviations of the protective hose from the conveying axis are compensated due to the rotatable and pivotable fastening, since a circular movement is possible within a restricted radius. Twisting during the rotating and pivoting movement is prevented as well, in particular regarding the protective hose.

It is advantageous if the wire core is fastened by a clamping means arranged rotatably within the torch housing, so the wire core may be replaced conveniently.

A transparent wire inlet nozzle is advantageous as well, allowing a more accurate placing during replacement of the wire core.

BRIEF DESCRIPTION OF THE DRAWINGS

The invention will be described by means of an exemplary embodiment in more detail below. In the drawings.

DETAILED DESCRIPTION OF PREFERRED EMBODIMENTS

Figure 1:
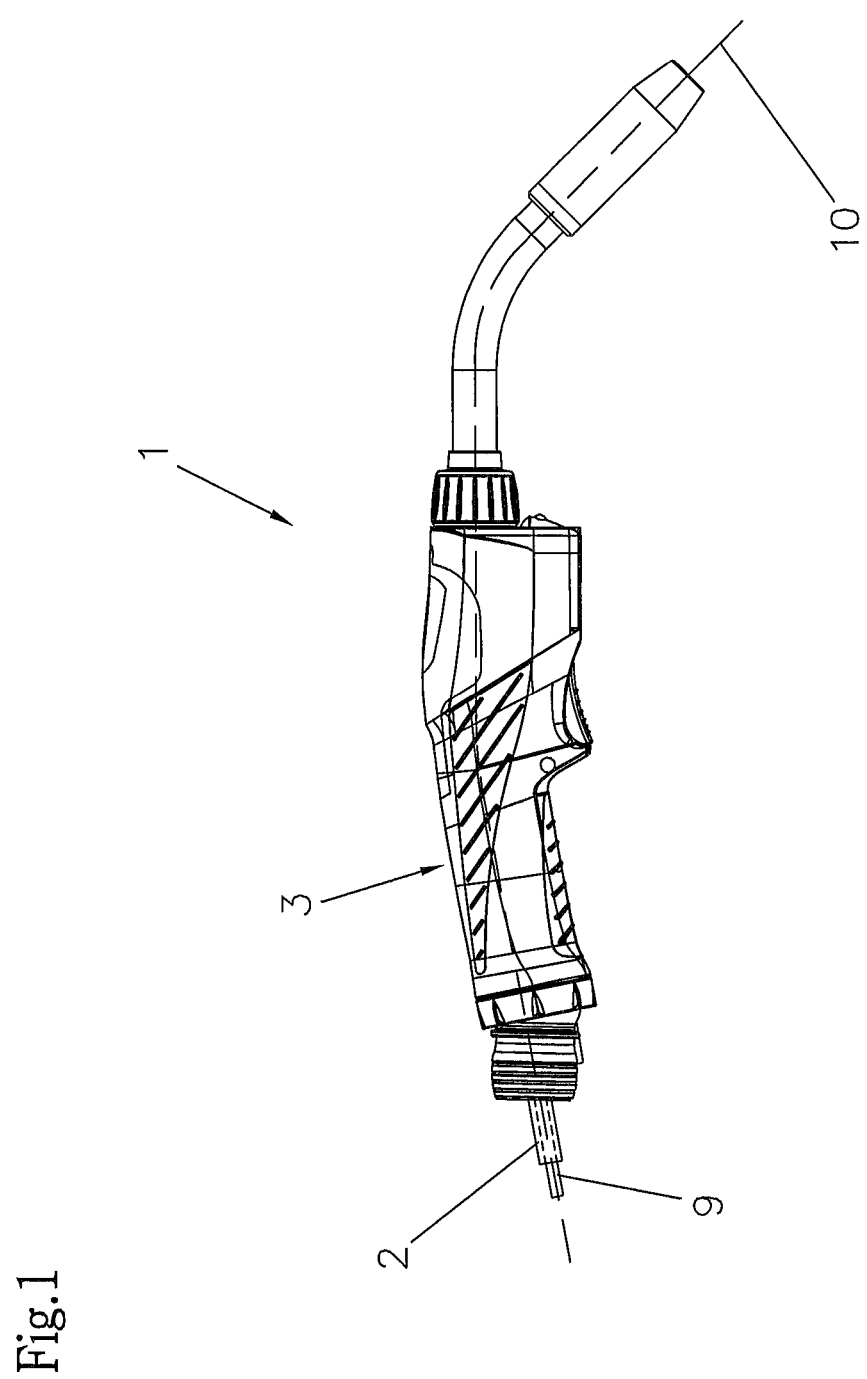
FIG. 1 shows a lateral view of a welding torch.

FIG. 1 shows a welding torch 1 with a pipe bend and a contact nozzle fastened to the torch housing 3. The welding torch 1 is connected to the welding device by a hose package. The protective hose 2, guided into the welding torch 1 by the hose package, is fastened within the handle of the torch, which usually comprises two handle shells. In the protective hose 2, the wire core 9 extends, in which the welding wire 10 is conveyed from the welding device into the welding torch 1 up to the contact tube.

Figure 2:
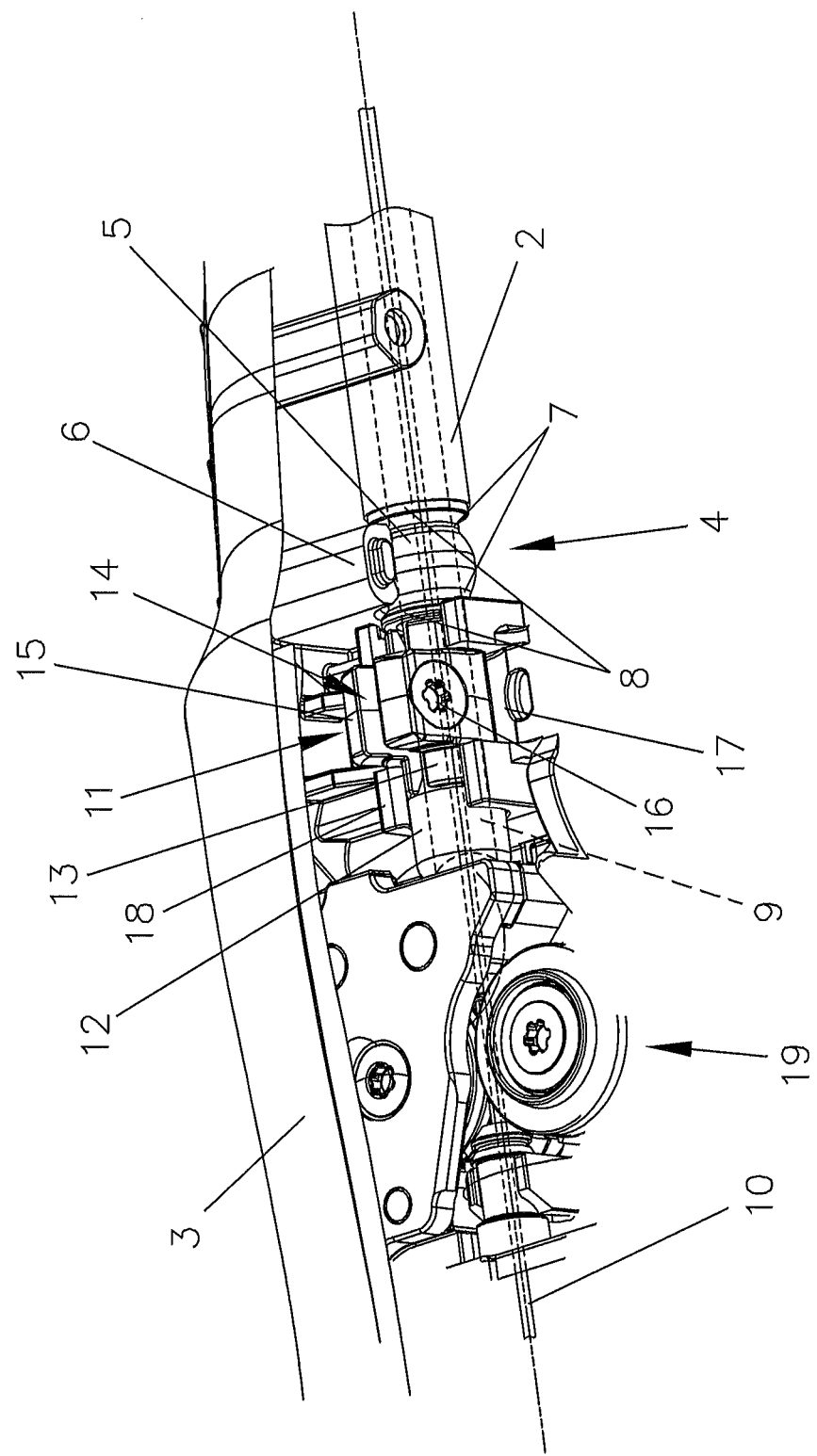
FIG. 2 shows a detailed view of a part of a welding torch in a view partly in section.

According to FIG. 2, a metal bushing 4 is arranged form-fit at the end of the protective hose 2. The bushing 4 is basically designed cylindrically, but a central part 5 is sphere-shaped. This central part 5 is used for fastening it within the handle shell, with a rotatable and/or pivotable support being provided and twisting within the torch housing 3 and/or the handle shells being prevented due to the sphere-shaped design. A circular movement of the bushing 4 within a restricted radius is possible as well. The protective hose 2 is thus rotatably fastened to the welding torch 1, allowing an infinite rotation. This fastening is independent from whether the welding torch 1 has a drive unit 19 or not.

Preferably, the fastening is performed such that in each of the handle shells of the torch housing 3 of the welding torch 1 a corresponding recess for the central part 5 of the bushing 4 is formed in the shape of a ridge 6. After assembling the handle shells to form the torch housing 3, the ridges 6 of the handle shells enclose the central part 5 of the bushing 4 while rotating and pivoting the bushing 4 remains possible. The protective hose 2 is thus rotatably fastened to the welding torch 1. Moreover, the protective hose 2 is fastened to the welding torch 1 in the axial direction. This is accomplished by two grooves 7 on both sides of the sphere-shaped central part 5 of the bushing 4, which are engaged by the ridges 6 of the handle shells. In addition to this, the bushing 4 is terminated by rings 8 at its ends, which delimit the grooves 7 with respect to the outside. An axial displacement of the bushing 4 is thus impossible.

In the protective hose 2, the wire core 9 is guided, within which the welding wire 10 is conveyed. Since the wire core 9 is intended to be designed replaceable in contrast to the protective hose 2, a fastening as described below in the form of a clamping device 11 is provided.

Seen in the conveying direction of the welding wire 10, the clamping device 11 is arranged downstream of the fastening of the protective hose 2. Corresponding receiving portions for mounting the clamping device 11 are provided in the handle shells of the torch housing of the welding torch 1. In general, the clamping device 11 has the shape of a pipe 13, wherein an axial slit 14 is provided. On both sides of the slit 14 and in the center of the pipe 13, elevations 15 are provided, connected by a screw 16, so when the screw 16 is tightened, the pipe 13 is compressed and the slit 14 narrows. If the wire core 9 extends through the pipe 13, the wire core 9 may be clamped and fixed by tightening the screw 16. This means that wire cores 9 having different diameters within certain boundaries may be fastened.

Preferably, the clamping device 11 is also mounted rotatably. For example, the clamping device 11 is arranged on a mounting plate 17, which is fixed in the receiving portions of the handle shells of the welding torch 1. The mounting plate 17 may, for example, have a receiving device 18 into which the clamping device 11 is fitted. In this case, the receiving device 18 receives the ends of the pipe 13, with a free space being provided for the elevations 15 of the pipe 13. This free space allows the rotating and/or pivoting of the clamping device 11 in a range of up to 180°.

However, the clamping device 11 may also be fastened in the handle shells, allowing an infinite rotation here as well. This means that no mounting plate 17 is required here. The protective hose 2 and the wire core 9 are rotatably fastened one behind the other within the housing of the welding torch 1. The wire core 9 projects beyond the clamping device 11 so the welder can place the end of the wire core 9 correctly.

Regarding a welding torch 1 having a drive unit 19, as illustrated in FIG. 2, the end of the wire core 9 is placed within a wire inlet nozzle 12 so the welding wire 10 may leave it under a very accurate, centered guidance and may be transferred to the drive unit 19. If the wire inlet nozzle 12 is designed transparently, this process is made considerably easier. Preferably, the wire inlet nozzle 12 is fastened in the receiving device 18 of the clamping device 11 on one side and in a pivoting axis of a tension lever for a pressing roller of the drive unit 19 on the other side. In such a construction, the welding wire 10 is conveyed through the pivoting axis of the tension lever. The design of the drive unit 19 is known in general from the prior art, so it is not described in detail.

Regarding a welding torch 1 without a drive unit, the end of the wire core 9 is placed within a contact tube, wherein the welding wire is contacted and then leaves the welding torch 1 (not illustrated) in MIG/MAG welding.

What is claimed is:

1. A welding torch, in particular a handheld welding torch, for a melting welding wire, the welding torch comprising:
   a torch housing;
   a protective hose;
   a wire core arranged within the protective hose and guiding the welding wire;
   a first fastening device fastening an end of the protective hose to the torch housing; and
   a second fastening device fastening an end of the wire core to the torch housing;
   wherein the protective hose and the wire core are fastened within the torch housing independently from one another;
   wherein the protective hose is fastened rotatably and pivotably to the torch housing via the first fastening device;
   wherein the wire core is fastened rotatably to the torch housing via the second fastening device; and
   wherein the second fastening device comprises a clamp arranged rotatably within the torch housing and is arranged downstream of the first fastening device with respect to a conveying direction of the welding wire.

2. The welding torch according to claim 1, wherein the torch housing comprises two handle shells;
   wherein the first fastening device comprises a bushing arranged at the end of the protective hose; and
   wherein the bushing has a sphere-shaped central part and two grooves and is arranged in a corresponding recess of the two handle shells.

3. The welding torch according to claim 1, further comprising a wire inlet nozzle;
   wherein an end of the wire core is placed in the wire inlet nozzle.

4. The welding torch according to claim 3, wherein the wire inlet nozzle is transparent.

* * * * *